United States Patent Office 2,772,247
Patented Nov. 27, 1956

2,772,247

ANTI-BLOCKING ADHESIVE COMPOSITION CONTAINING POLYETHYLENE, TACKIFYING RESIN, AND A POLYVINYL ESTER

George O. Schroeder, Chicago, Ill., assignor to American Can Company, New York, N. Y., a corporation of New Jersey No Drawing. Application November 20, 1951,
Serial No. 257,437

7 Claims. (Cl. 260—27)

This invention relates to an adhesive composition having superior antiblocking properties and refers more particularly to a composition comprising a polymeric vinyl ester of a lower molecular weight aliphatic acid, a tackifying resin and an ethylene polymer and the method of making the composition.

An object of the invention is the provision of an adhesive, used for example, in fibre container manufacture which will not block under factory operating conditions of relatively high temperature and humidity and to a method of making such adhesive.

Another object is the provision of a compatible mixture of a polymeric vinyl ester of a lower molecular weight aliphatic acid, a tackifying resin and an ethylene polymer without the use of an emulsifying agent.

Still another object is the provision of a thermoplastic or hot melt adhesive into which an ethylene polymer is incorporated as an antiblocking agent without impairing the adhesive strength or flexibility of the compound.

Numerous other objects and advantages of the invention will be apparent as it is better understood from the following description which is of a preferred embodiment thereof.

Hot melt adhesives composed wholly of thermoplastic substances, without solvents, are important in the manufacture of containers, especially fibre containers, that are liquid-proof, odor and taste-free and non-toxic. Adhesives of this type must maintain their adhesive strength and be flexible over a fairly wide range of temperature after they are set to prevent breaks in the bond due to embrittlement or shock. They must have a fairly wide "tack" range, in order that they can be successfully applied over a broad temperature range, since control of application and sealing temperatures within narrow limits is usually impractical.

It is common knowledge that individual polymers and mixtures of resins rarely have sharp melting points and that an increase in temperature gradually increases tackiness, until a completely fluid stage is reached.

In the manufacture of containers, especially fibre containers, the adhesive is generally applied in the molten state to container blank parts, for example container blank parts which later form the seams or joints, before the assembling operations are carried out. Body and end parts, properly coated with the adhesive are fed individually from stacks into a machine that automatically unites and bonds the several parts into a composite whole. Considerable difficulty has been experienced with hot melt adhesives heretofore available, because of the tendency of adhesively coated container blank parts to adhere to each other or "block" during warm, humid weather. This "blocking" trouble is especially prevalent in Southern factory locations. When "blocking" occurs it is often difficult to separate container blanks parts individually from a stack, and, thus, two or more adhering parts are frequently fed into a container assembling machine. This results in jams that seriously affect production, because of the stoppages required to remove the wedged stock from the machine and sometimes such jams result in injuries to the machines.

After experimenting with many adhesive combinations, I discovered that if polyethylene is incorporated into an adhesive made from polyvinyl acetate and a tackifying resin, the composition not only retains its adhesive qualities, but does not block under conditions of relatively high heat and/or humidity. No blocking was noted at temperatures as high as 100° F. and a relative humidity of 96%.

The preferred polyethylenes of my compositions have a molecular weight not substantially lower than 4,000 nor substantially greater than 10,000. Structurally, the preferred polyethylenes are relatively linear. At room temperature they are brittle solids, as contrasted with the waxy appearance of the branched chain very high molecular weight polyethylenes. The brittle, relatively linear, low molecular weight ethylene polymers do not have appreciably different adhesive characteristics from the waxy types, but they are miscible with the other ingredients of my compositions in higher proportions and can be used in quantities varying between 2 and 10 percent by weight of the mixture. The preferred range is from 4 to 8 percent polyethylene. Proportions of polyethylene higher than 10 percent affect the adhesive qualities adversely and also result in compositions that are so viscous, even at temperatures as high as 390–400° F., that they cannot be applied properly to a blank or sheet. A mixture containing somewhat less than 2 percent by weight of the preferred polyethylene does not have sufficient antiblocking properties to be useful at extremes of temperature and/or humidity.

The tackifying resins that are suitable are wood and gum rosins, hydrogenated rosins, polymerized and partially polymerized rosins; glycol, glycerol and pentaerythritol esters of said rosins and rosin derivatives; and thermoplastic resins formed by condensing a terpene with phenol. Examples of terpenes are alpha and beta pinene. The glycols suitable for esterification of rosin and rosin derivatives are those having from two to four carbon atoms. These tackifying resins can be used singly or in any combination. The concentration or proportion of the resins can vary from 17 to 43 percent by weight of the mixture.

The polyvinyl acetate may vary considerably in molecular weight, as determined by the viscosity of a 20 percent solution of the resin in acetone, at 25° C., using a No. 4 Ford cup and reported in seconds. The viscosity grades that were found suitable range from about 13 to 28 seconds. Any one grade or any mixture of the various viscosity grades can be used. In place of the polyvinyl acetate, polyvinyl propionate and polyvinyl butyrates can be substituted or a mixture of the resins can be employed. The concentration or proportion of vinyl ester ranges from 47 to 81 percent by weight of the mixture.

In general, the adhesive containing only the higher molecular weight polyvinyl acetate requires less polyethylene to acquire antiblocking properties. The adhesive can be made with tackifying resins that are completely compatible with the various polyvinyl esters of lower molecular weight aliphatic acids. If the lower molecular weight polyvinyl acetates are employed, it is preferable, but not necessary, to use a combination of tackifying resins one of which is completely compatible in all proportions with the polyvinyl ester and the other compatible only in proportions of about 1 part of vinyl polymer to about 1 part tackifying resin. Completely compatible tackifiers tend to render the adhesive quite tacky and therefore require a high concentration of polyethylene to overcome this condition.

The following are exemplary formulae for my adhesives.

*Polyvinyl acetates having a viscosity of approximately 13–14 seconds*

Ingredient: Percent by weight
1. Polyvinyl acetate _____ 75
   Pentaerythritol ester of rosin _____ 10
   Gum rosin (rosin anhydride) _____ 10
   Polyethylene (Alathon F) _____ 5
2. Polyvinyl acetate _____ 72
   Pentaerythritol ester of rosin _____ 22
   Polyethylene (Alathon F) _____ 6
3. Polyvinyl acetate _____ 72
   Thermoplastic terpene phenol resin _____ 20
   Polyethylene (Alathon F) _____ 8
4. Polyvinyl acetate _____ 72
   Glycerol ester of hydrogenated rosin _____ 10
   Pentaerythritol ester of rosin_____ 10
   Polyethylene (Alathon F) _____ 8
5. Polyvinyl acetate _____ 75
   Polymerized rosin _____ 18
   Polyethylene (Alathon F) _____ 7
6. Polyvinyl acetate _____ 80
   Gum rosin _____ 17
   Polyethylene (Alathon F) _____ 3
7. Polyvinyl acetate _____ 72
   Thermoplastic terpene phenol resin _____ 22
   Polyethylene (DYGT) or Alathon E or F)__ 6
8. Polyvinyl acetate _____ 72
   Pentaerythritol ester of rosin_____ 15
   W. W. rosin _____ 7
   Polyethylene (Alathon F) _____ 6

*Formulations in which the polyvinyl acetate has a viscosity of about 19 seconds.*

Ingredient: Percent by weight
9. Polyvinyl acetate _____ 60
   Pentaerythritol ester of rosin_____ 10
   Gum rosin _____ 27
   Polyethylene (Alathon F) _____ 3
10. Polyvinyl acetate _____ 60
    Thermoplastic terpene phenol resin _____ 15
    Gum rosin _____ 20
    Polyethylene (Alathon F) _____ 5
11. Polyvinyl acetate _____ 60
    Pentaerythritol ester of rosin_____ 15
    Gum rosin _____ 20
    Polyethylene (Alathon E) _____ 5
12. Polyvinyl acetate _____ 72
    Gum rosin _____ 8
    Pentaerythritol ester of rosin_____ 15
    Polyethylene DYJT _____ 5

*Formulations in which the polyvinyl acetate has a viscosity of approximately 28 seconds.*

Ingredient: Percent by weight
13. Polyvinyl acetate _____ 55
    Gum rosin _____ 43
    Polyethylene (Alathon F) _____ 2
14. Polyvinyl acetate _____ 55
    Gum rosin _____ 30
    Thermoplastic terpene phenol resin _____ 12
    Polyethylene DYGT _____ 3
15. Polyvinyl acetate _____ 55
    Gum rosin _____ 35
    Polyethylene (Alathon E) _____ 10

*Formulations in which a mixture of approximately 14 and 19 second polyvinyl acetates is used.*

Ingredient: Percent by weight
16. Polyvinyl acetate (14 sec.)_____ 45
    Polyvinyl acetate (19 sec.)_____ 30
    Pentaerythritol ester of rosin_____ 20
    Polyethylene (Alathon F) _____ 5
17. Polyvinyl acetate (14 sec.)_____ 35
    Polyvinyl acetate (19 sec.)_____ 30
    Pentaerythritol ester of rosin_____ 10
    Thermoplastic terpene phenol resin _____ 23
    Polyethylene (Alathon F) _____ 2
18. Polyvinyl acetate (14 sec.)_____ 40
    Polyvinyl acetate (19 sec.)_____ 25
    Pentaerythritol ester of rosin_____ 10
    Gum rosin _____ 20
    Polyethylene (Alathon E) _____ 5
19. Polyvinyl acetate (14 sec.)_____ 50
    Polyvinyl acetate (19 sec.)_____ 20
    Pentaerythritol ester of rosin_____ 22
    Polyethylene DYDT _____ 8
20. Polyvinyl acetate (14 sec.)_____ 50
    Polyvinyl acetate (19 sec.)_____ 20
    Thermoplastic terpene phenol resin _____ 25
    Polyethylene (Alathon F) _____ 5
21. Polyvinyl acetate (14 sec.)_____ 50
    Polyvinyl acetate (19 sec.)_____ 20
    Polymerized rosin _____ 22
    Polyethylene (Alathon E) _____ 8

*Adhesives in which a mixture of 14 second and 28 second polyvinyl acetates is employed.*

Ingredient: Percent by weight
22. Polyvinyl acetate (14 sec.)_____ 25
    Polyvinyl acetate (28 sec.)_____ 35
    W. W. rosin _____ 32
    Polyethylene (Alathon F) _____ 8
23. Polyvinyl acetate (14 sec.)_____ 55
    Polyvinyl acetate (28 sec.)_____ 15
    Pentaerythritol ester of rosin_____ 15
    W. W. rosin _____ 8
    Polyethylene (Alathon F) _____ 7

In these formulations Alathon E and F are relatively linear polyethylenes having a molecular weight of about 6000 to 8000, marketed by E. I. du Pont de Nemours. Polyethylenes DYDT, DYGT and DYJT are marketed under these names by the Bakelite Corporation. All have relatively linear structures. DYDT has a molecular weight of about 4000, DYGT about 7,000 and DYJT has a molecular weight of about 10,000.

The terpene phenol thermoplastic resins are sold as SP552 and SP556 by Schenectady Varnish Company.

The pentaerythritol esters of rosin are marketed by Hercules Powder Company as Pentalyn A and Pentalyn G.

Where mixtures of polyvinyl acetates are designated, the 28 second viscosity vinyl polymer can replace either the 14 or 19 second type.

Polyvinyl propionates and butyrates can be substituted in whole or in part for the acetate in all these formulations.

In all the examples the polyethylene is a relatively linear polymer having a molecular weight of from about 4000 to about 10,000. The several molecular weight grades can be used interchangeably, inasmuch as their melting and miscibility characteristics do not vary appreciably for my purposes.

In preparing my compositions, I first melt the tackifying resin. When this is completely molten I add the polyvinyl ester in small quantities, preferably about one third the required amount, and mix the ingredients until they are molten and well blended. This latter step usually requires about five minutes. Another third of the vinyl polymer is then added and mixed until uniform. A period of about five minutes suffices, after which the last portion of vinyl polymer is added and mixed for about fifteen minutes or until the vinyl polymer and tackifying resin form a uniform molten mixture. The temperature at this point must be at least as high as the melting point of the polyethylene and preferably slightly higher. The ethylene polymer is now added and the temperature maintained above the melting point. The entire mixture is stirred to thoroughly blend all the materials in the composition. A mixing time of 35 minutes is usually sufficient after adding the polyethylene. The adhesive is now ready for immediate use or it can be cast into molds and solidified for storage and shipment.

It is thought that the invention and many of its attendant advantages will be understood from the foregoing description, and it will be apparent that various changes may be made in the matter of the ingredients, their identity and their proportions and in methods of compounding without departing from the spirit and scope of the invention or sacrificing all of its material advantages, the form hereinbefore described being merely a preferred embodiment thereof.

I claim:

1. A non-blocking adhesive composition comprising about six percent by weight of a relatively linear polyethylene having a molecular weight from about 6,000 to 8,000, about 22 percent by weight of a pentaerythritol ester of rosin as a tackifying resin, and about 72 percent by weight of a polyvinyl acetate having a viscosity of about 14 seconds as measured by a 20 percent acetone solution at 25° C. with a No. 4 Ford cup.

2. A non-blocking adhesive composition comprising about three percent by weight of a relatively linear polyethylene having a molecular weight from about 6,000 to about 8,000, about ten percent by weight of a pentaerythritol ester of rosin, about 27 percent by weight of gum rosin, and about 60 percent by weight of a polyvinyl acetate having a viscosity of about 19 seconds as measured by a 20 percent acetone solution at 25° C. with a No. 4 Ford cup.

3. A non-blocking adhesive composition comprising about 6 percent by weight of a relatively linear polyethylene having a molecular weight of from about 6,000 to 8,000, about 22 percent by weight of a thermoplastic terpene-phenol resin, and about 72 percent by weight of a polyvinyl acetate having a viscosity of about 14 seconds as measured by a 20 percent acetone solution at 25° C. with a No. 4 Ford cup.

4. A non-blocking adhesive composition comprising about 6 percent by weight of a relatively linear polyethylene having a molecular weight from about 6,000 to 8,000, about 15 percent by weight of a pentaerythritol ester of rosin, about 8 percent by weight of rosin, and about 72 percent by weight of polyvinyl acetate having a viscosity of about 14 seconds as measured by a 20 percent acetone solution at 25° C. with a No. 4 Ford cup.

5. The method of making a non-blocking, thermoplastic adhesive comprising melting about from 17 to 43 percent by weight of a tackifying resin selected from the group consisting of a rosin, a rosin polymer, a polyhydric alkanol ester of rosin, a thermoplastic terpene-phenol resin and mixtures thereof, adding to the molten tackifying resin in increments with continuous agitation to form a homogeneous mass about from 47 to 81 percent by weight of a polyvinyl alkanoic acid ester having a viscosity of about from 13 to 28 seconds as determined by a 20 percent solution in acetone at 25° C. with a No. 4 Ford cup and in which the alkanoic acid has from 2 to 4 carbon atoms, and uniformly blending in said mass about from 2 to 10 percent by weight of a relatively linear polyethylene having a molecular weight of about from 4,000 to 10,000.

6. A non-blocking adhesive composition comprising from about 2% to 10% by weight of a polyethylene having a molecular weight of from about 4,000 to about 10,000, from about 17% to 43% by weight of a tackifying resin selected from the group consisting of a rosin, a rosin polymer, a polyhydric alkanol ester of rosin, a thermoplastic terpene-phenol resin and mixtures thereof, and about from 47% to 81% by weight of a polyvinyl ester of a lower molecular weight alkanoic acid having a viscosity of from about 13 to 28 seconds as measured by a 20% solution in acetone at 25° C. with a No. 4 Ford cup, said alkanoic acid having from 2 to 4 carbon atoms.

7. A non-blocking adhesive composition comprising from about 4% to 8% by weight of a relatively linear polyethylene having a molecular weight of from about 4,000 to about 10,000, from about 17% to 43% by weight of a tackifying resin selected from the group consisting of a rosin, a rosin polymer, a polyhydric alkanol ester of rosin, a thermoplastic terpene-phenol resin and mixtures thereof, and about from 47% to 81% by weight of a polyvinyl acetate having a viscosity of from about 13 to 28 seconds as measured by a 20% solution in acetone at 25° C. with a No. 4 Ford cup.

References Cited in the file of this patent

UNITED STATES PATENTS

| | | |
|---|---|---|
| 2,361,418 | Robinson | Oct. 31, 1944 |
| 2,508,893 | Sadowski et al. | May 23, 1950 |
| 2,517,014 | Miller et al. | Aug. 1, 1950 |
| 2,551,087 | Barnbort et al. | May 1, 1951 |
| 2,616,824 | Meiler et al. | Nov. 4, 1952 |

OTHER REFERENCES

Alathon-Polythene Resins, du Pont de Nemours & Co., Wilmington, Del., pages 3 and 32, 1949.